United States Patent [19]

Wald

[11] Patent Number: 4,793,549

[45] Date of Patent: * Dec. 27, 1988

[54] MODIFIED REUSABLE CLOSURE DEVICE FOR CARTONS FOR GABLE TOPS

[76] Inventor: Hy Wald, 108 Flick Dr., Fort Washington, Pa. 19034

[*] Notice: The portion of the term of this patent subsequent to Mar. 3, 2004 has been disclaimed.

[21] Appl. No.: 159,155

[22] Filed: Feb. 23, 1988

[51] Int. Cl.⁴ .............................................. B65D 45/04
[52] U.S. Cl. .......................... 229/125.39; 229/125.37; 229/160.2
[58] Field of Search ....................... 229/125.37, 125.39, 229/125.08, 125.06, 125.09, 125.12, 52 A, 160.2, 23 BT; 383/69; 206/621.1, 631.3, 815; 24/30.5 R, 30.5 L, 489, 462; D7/70; D9/434, 455, 499

[56] References Cited

U.S. PATENT DOCUMENTS

| | | | |
|---|---|---|---|
| 2,533,539 | 12/1950 | Vivian | 24/30.5 R |
| 2,586,931 | 2/1952 | Gammon | 24/30.5 R |
| 2,647,524 | 8/1953 | Heavens, Jr. | 229/160.2 |
| 3,217,967 | 11/1965 | Jackson | 229/125.08 |
| 3,381,875 | 5/1968 | Tunick | 229/160.2 |
| 3,381,883 | 5/1968 | Harris | 229/125.19 |
| 3,458,110 | 7/1969 | Goldman | 229/125.12 |
| 3,680,771 | 8/1972 | Blunsdon | 383/69 |
| 3,693,864 | 9/1972 | Wilkins | 229/125.12 |
| 4,109,351 | 8/1978 | Coffey | 229/125.37 |
| 4,323,188 | 4/1982 | Dickerson | 206/815 |
| 4,498,585 | 2/1985 | Gordon et al. | 383/69 |
| 4,588,081 | 5/1986 | Newsome et al. | 229/23 BT |
| 4,619,398 | 10/1986 | Laramie | 229/125.12 |
| 4,646,961 | 3/1987 | Wald | 206/631.3 |

Primary Examiner—Stephen Marcus
Assistant Examiner—Gary E. Elkins
Attorney, Agent, or Firm—Caesar, Rivise, Bernstein, Cohen & Pokotilow, Ltd.

[57] ABSTRACT

A device for protecting the contents of cartons with gable tops from odor, dust, dirt or other contaminants and from spillage after the carton is opened. The device is placed upon the carton and covers a portion of the top part of the carton. A longitudinal gap in the device encloses and presses together the top strips of the carton, which were pried apart to form a spout for dispensing the contents of the carton, thereby closing the carton.

The present device possesses shortened inclined walls as well as end walls having a lower arcuate convex edge to facilitate a gripping by the fingers of a user.

2 Claims, 1 Drawing Sheet

U.S. Patent  Dec. 27, 1988  4,793,549
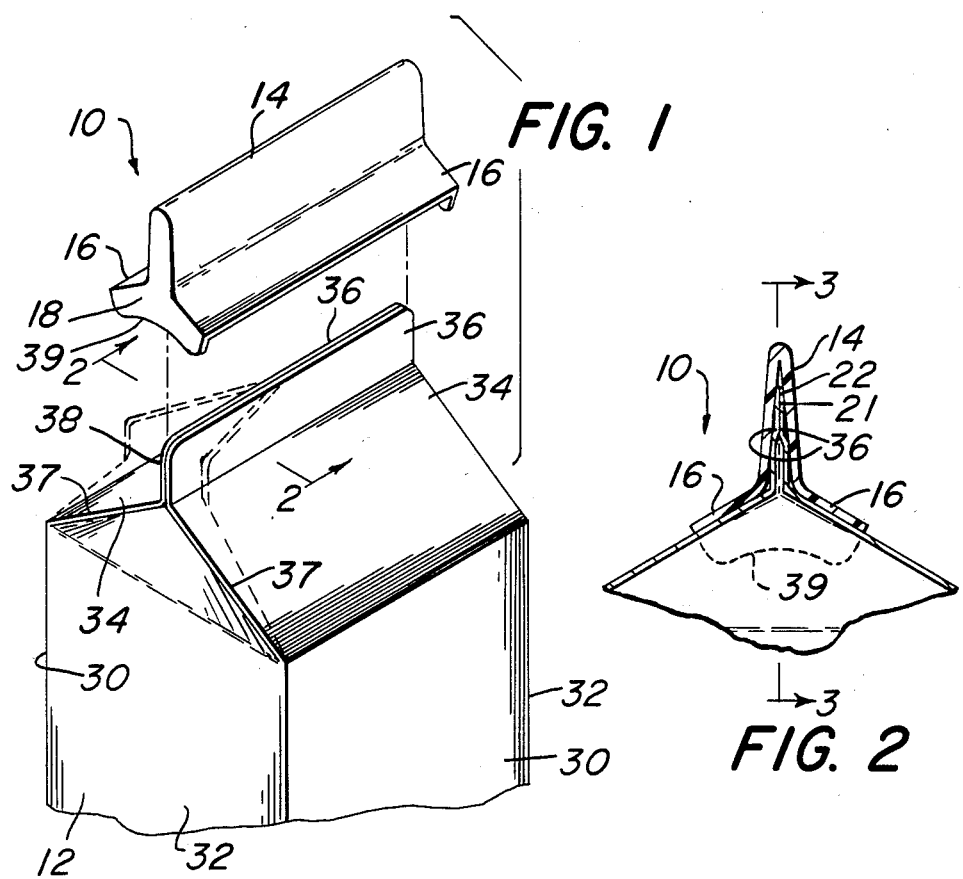
FIG. 1
FIG. 2
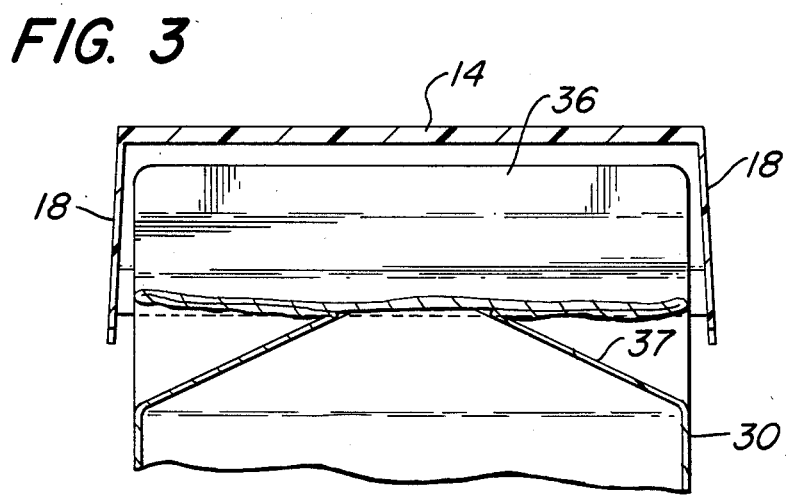
FIG. 3

MODIFIED REUSABLE CLOSURE DEVICE FOR CARTONS FOR GABLE TOPS

BACKGROUND OF THE INVENTION

This invention relates generally to an inexpensive device which may be applied to standard cartons to reclose the cartons after they have initially been opened, so that the contents are protected against odor, dust, dirt, or other contaminants, and against spillage of the contents.

In recent years, the packaging materials for milk, fruit juices, and many other materials have changed from glass or plastic containers to heavy paper or cardboard cartons, particularly for half gallon sizes or less. These cartons have gable tops, are often wax impregnated or wax coated, and multi-layered strips at the top of the carton which are heat sealed together to close the carton. By prying apart the strips at one side of the carton, a pouring spout is formed to enable easy dispensing of the contents of the carton.

After the dispensing of the desired amount of contents, the spout may then be folded back inward. However, the closure is now imperfect since the heat seal on the pried portion of the strip has been broken and the various layers of the strip are no longer in close contact with each other. Thus the contents of the carton are subject to contamination by moisture, odors, dust, dirt and the like. Further the contents of the carton are subject to spillage.

This invention provides an inexpensive, easily applied, means for closing and protecting the contents of cartons after they have been initially opened. A flanged cap is placed over the strips at the top of the carton, which have been pried apart to allow for dispensing of the contents of the carton. The interior surfaces of the cap, defining a longitudinal slot, press the layers of the strips together to close the carton and protect its contents. It can be applied to any standard carton of the type described above and is easily removed when the user wishes to dispense part of the contents of the carton and when the carton is empty and ready for disposal by the user. Thus one or two of these devices may serve a household, and may be used and reused ad infinitum.

Further, the device may be dimensioned to fit any standard size carton, i.e., one pint, one quart, one-half gallon, etc. For larger cartons, such as one-half gallon sizes, holders are often used to supply a handle for ease of dispensing of the contents. The invention may also comprise such a holder for the carton, with a top portion for supplying the closure either as a separate element which snaps on to the holder, or as an element hinged to the holder which can be opened or closed to supply the closure.

Previous devices for the closure of gable types of cartons have been incorporated in the carton design and have been manufactured and supplied with the carton. Blunsdon, U.S. Pat. No. 3,680,771 shows a closure device wherein the container includes a flap which folds over one of the top strips of the container with a spring clip inserted over the flap to provide the closure.

Ringler, U.S. Pat. No. 2,336,503 teaches a gable or bellows container sliding closure comprised of a slotted closure member which slides over the top strip of the container. Again in this case the containers are specifically designed to incorporate the closure mechanism, and the closure element is supplied with the container when the container is manufactured.

A closure device for a flat top box is shown by Burgener, U.S. Pat. No. 2,030,134. It is employed where the contents are removed from the box by punching holes or perforations in the top of the box.

It has been further suggested in U.S. Pat. Nos. 3,381,883; 3,458,110 and 3,463,380 to employ clip-type devices which basically have to be slipped onto or about the outer surfaces of the strips which define the opening in the gable top of the carton. A similar clip-type device is shown in Jackson, U.S. Pat. No. 3,217,967 wherein the clip is pivotally secured to the strips of the carton.

All of the foregoing problems were solved with prior U.S. Pat. No. 4,646,961, the entire disclosure of which is hereby incorporated by reference, issued Mar. 3, 1987, of the present inventor. In the most simple aspect of the closure device of U.S. Pat. No. 4,646,961 there was provided a closure device which comprised a flanged cap with a pair of inner surfaces defining a longitudinal slot. Such closure device further included inclined side walls extending from the flanged cap and adapted to make a snug fit with the cap top, with there being front and rear walls extending downwardly from the flanged cap. In this device, the strips of the gable top carton were guided the slot. Also in the device of U.S. Pat. No. 4,646,961, the front and rear walls extended between the inclined side walls, and there was a pair of skirts which extended from the lower edge of each of the inclined side walls and spanned the lower portions of the front and rear walls.

The closure device of U.S. Pat. No. 4,646,961 has worked well. It need only be applied to the gable top without any special guidance or special manipulation. However, the present inventor has recognized a need to eliminate a considerable portion of the plastic used in a closure device as well as to facilitate the gripping of a closure device from the end walls in lieu of or supplementary with grasping of the closure device along the top section or flanged cap or tab.

Except for the closure device of U.S. Pat. No. 4,646,961, none of the above devices or others previously designed allow for a continuously reusable closure for cartons with gable tops. The instant device may be used with all standard types of containers and does not require any special container designs. Previous designs do not obtain closure by enclosing the strips at the top of the carton, which were previously pried apart, within a longitudinal slot in a cap placed on the carton. Further, previously designed closure devices do not incorporate a section for holding and ease of handling larger cartons.

OBJECTS OF THE INVENTION

Accordingly, it is the general object of the invention to provide a closure device for cartons with gable tops which protects the contents of the carton from contamination or spillage after the carton has been opened, and which overcomes the disadvantages of the prior art.

It is another object of the invention to provide a closure device for standard sized, commercially available, cartons with gable tops.

It is a further object of the invention to provide a closure device for cartons with gable tops which is easily applied and removed from the cartons.

It is yet a further object of this invention to provide a closure device for cartons with gable tops which is reusable and may be further applied to cartons, after the carton in use has been disposed of, for an extended period of time.

It is still yet a further object of this invention to provide a closure device for cartons with gable tops which incorporates a holder for the carton with a handle to enable ease of handling and dispensing of the contents of the carton.

Finally, another object of the invention is to provide a modified reusable closure device for cartons for gable tops which utilized minimal amounts of plastic.

SUMMARY OF THE INVENTION

The present invention comprises a flanged or upstanding cap or gripping tab in which a longitudinal slot has been formed, defined by the inner surfaces thereof. Two short inclined side walls extend downwardly and outwardly from the bottom of the cap or tab. When the closure device is placed on the carton, the strips at the top of the carton, (which were previously pried open to allow for access to the contents of the carton) are inserted within the slot by the action of the seating of the short inclined walls against the gable top. In this way the multiple layers of the carton strips are pressed together to provide a closure for the carton. The short inclined walls abut and rest upon the inclined panels of the carton. An arcuate concave edge is formed in the inclined walls to facilitate finger gripping.

DESCRIPTION OF THE DRAWINGS

Other objects and many of the attendant advantages of this invention will be readily appreciated when the same becomes better understood by reference to the following detailed description when considered in connection with the accompanying drawing wherein:

FIG. 1 is an exploded isometric view of a closure device and a standard carton with a gable top;

FIG. 2 is an enlarged sectional view taken along line 2—2 of FIG. 1 wherein the closure device of the present invention has been placed upon the carton; and FIG. 3 is an enlarged sectional view taken along line 3—3 of FIG. 2.

DETAILED DESCRIPTION OF THE PREFERRED EMBODIMENT

Referring now in greater details to the various figures of the drawing wherein like reference characters refer to like parts, there is shown in FIG. 1 a closure device 10 for use with a conventional carton having a gable top arranged to be peeled open to form a pouring spout. The device 10 is arranged for disposition over the gable top to hold it closed, after it has been opened, thereby preventing the ingress of contaminants, odors or air therein, while also precluding any accidental spillage therefrom.

The device 10 basically comprises a flanged cap or tab 14 with a pair of inclined short side walls 16 extending from the flanged cap or tab 14. There are also end walls 18 (only one shown in FIG. 1) which are defined by the tab 14 and shortened side walls 18. In the preferred embodiment, the side walls 16 will have a width of ⅜ inch, although they can be as wide as one inch or more. Such embodiment is adapted to fit on a standard size two quart gable top carton having a width and end dimension of 3 and ¾ of an inch. Where desired, the width of the cap or tab 14 can be less than the width of the short side walls 16 to provide an inclined edge instead of the right angle edge 17 of FIG. 1.

The carton 12 is a standard carton which is in prevalent use for holding milk, fruit juices, and other type materials. Thus, carton 12 comprises a base (not shown), a pair of side walls 30, a front and back panel 32, a pair of inclined panels 34 which terminate at their upper end in a pair of strips 36.

At the time of manufacture, after carton 12 has been filled with its contents, the strips 36 are sealed together longitudinally along their length to close the carton. Usually a heat sealing technique is used.

As in conventional cartons, in order to gain access to the contents of the carton, the consumer grasps the front edges 37 of the inclined panels 34 to pry apart the front end 39 of strips 36 to separate them as shown by the phantom lines in FIG. 1. The strips 36 are double layered, so that a spout (not shown) may be formed by pulling back (outward) the inside layer of each of the strips 36. The contents of the carton 12 may then be dispensed via the spout. After use, the inner layers of strips 36 are pushed back so they are again parallel with the outer layers of strips 36. However, since the seal has been broken, a gap exists, whereby moisture, odors, dust, dirt and the like can contaminate the contents of the carton 12. Further if carton 12 is inadvertently tipped over, its contents may be spilled. When the closure device 10 is placed over a carton which has been opened, it will close the carton and protect the contents of the carton against contamination and spillage, as described below.

Referring now to FIG. 2, it is seen that when closure device 10 is placed upon carton 12, the vertical strips 36 of the carton's top are enclosed and held together by the interior surfaces 21 of the slot 22 in the closure device. Moreover, the short inclined walls 16 of the device 10 abut and rest upon the inclined panels 34 of the carton 12. Thus, it is seen that closure device 10 fits upon the top of the carton 12, and closes carton 12 by pressing vertical strips 36 together and guiding the same into the slot 22. This protects the contents of carton 12 from contamination and spillage.

Each time access to the contents of carton 12 is desired, the device 10 is easily removed from the top of carton 12 to permit such access by grasping its flanged cap or tab 14 (or by fingering the end walls as discussed hereinafter) or by grasping arcuate edge 39 as will be discussed hereinafter and pulling the device 10 away from carton 12. When all of the contents of carton 12 have been dispersed, and carton 12 is disposed of, the closure device is available for use on other cartons of the same size. Thus, the flanged cap 14 also provides a gripping area for installing closure device 10 on carton 12. The cap or tab 14 may be made with a top edge of a different shape, such as a rounded top or with the modified rounded top of the device of U.S. Pat. No. 4,646,961.

Device 10 may be sold to the general public for use by consumers to protect the contents of gable top cartons they may possess. Another possible method of distribution and sale of closure device 10 would be as a "give-away" for advertising purposes and promotions. Thus, the surfaces of cap or tab 14 may contain printed advertising indicia thereon.

It should be noted that the lower edge of end wall 18 has an arcuate concave edge 39 which is a finger grip or finger gripping means. The arcuate edge 39 enables a person to embrace the device 10 using one or more fingers at each end. This facilitates separation and removal of the device 10 from the strips 36 of the carton 12.

Without further elaboration the foregoing will so fully illustrate the invention that others may, by applying current or future knowledge, readily adapt the same for use under various conditions of service.

What is claimed is:

1. A closure device for a carton with a gable top, said device comprising: a cap including a pair of inner surfaces defining a longitudinal slot, said device further including shortened inclined walls extending from said cap and adapted to make a fit with said gable top, said device further including end walls extending downwardly from said cap, said carton comprising: a pair of strips, said strips having inner and outer surfaces, the inner surfaces of said strips being sealed together along their longitudinal length so that when one end of said strips is pried apart, a pouring spout is formed for dispensing the contents of said carton, and when said device is placed onto said carton, said outer surfaces of said strips of said carton are disposed within said slot in a confining relationship whereupon said inner surfaces forming said slots hold said strips closed together thereby protecting the contents of said carton from spillage or the ingress of contaminants therein, with said shortened inclined side walls conforming to said carton to guide said carton strips into said slot and wherein said end walls are in part defined by an inclined convex arcuate edge to facilitate gripping by one or more fingers of a user.

2. The device of claim 1 wherein said device is formed of plastic.

* * * * *